United States Patent
Wilkin

[15] 3,655,025
[45] Apr. 11, 1972

[54] SIDE EJECTOR FOR BAND SAW CONVEYOR OR THE LIKE

[72] Inventor: John P. Wilkin, Schaumburg, Ill.

[73] Assignee: Armstrong-Blum Manufacturing Company, Chicago, Ill.

[22] Filed: June 29, 1970

[21] Appl. No.: 50,706

[52] U.S. Cl. .................................................198/24, 60/97 E
[51] Int. Cl. ......................................F01k 23/00, B65g 47/00
[58] Field of Search ..........................198/24; 91/171; 60/97 E; 214/1 PB, 775

[56] References Cited

UNITED STATES PATENTS

| | | | |
|---|---|---|---|
| 2,348,899 | 5/1944 | Guignard | 214/775 |
| 3,245,129 | 4/1966 | Entz | 214/1 PB |
| 3,067,851 | 12/1962 | O'Rourke | 198/24 |
| 1,643,714 | 9/1927 | Howells | 198/24 |
| 3,480,328 | 11/1969 | Canlson | 91/171 |
| 3,033,219 | 6/1962 | Erie | 91/171 |
| 2,808,921 | 10/1957 | Knowles | 198/24 |
| 3,543,644 | 12/1970 | Stacey | 60/97 E |

Primary Examiner—Richard E. Aegerter
Attorney—Wolfe, Hubbard, Leydig, Voit & Osann

[57] ABSTRACT

A side ejector for a conveyor which includes an ejector bar normally extending in storage position along one side of the conveyor and which is connected at its ends to drive chains, the chains extending transversely and driven by individual reversible actuators for sweeping the bar laterally across the conveyor. To achieve substantially the same amount of stroke at each end of the bar, the actuators are supplied through a flow divider. Each actuator has a diverter valve for diverting pressure fluid into the sump upon completion of its stroke thereby to insure that the actuators remain precisely in step with one another free of any cumulative error.

3 Claims, 10 Drawing Figures

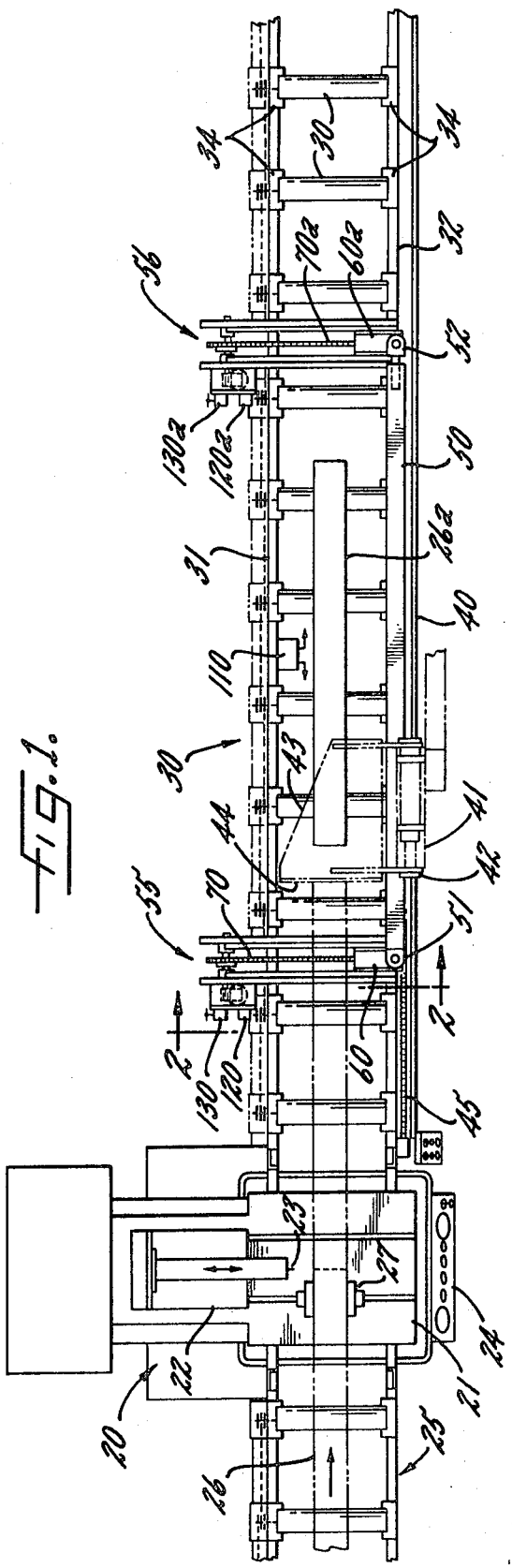

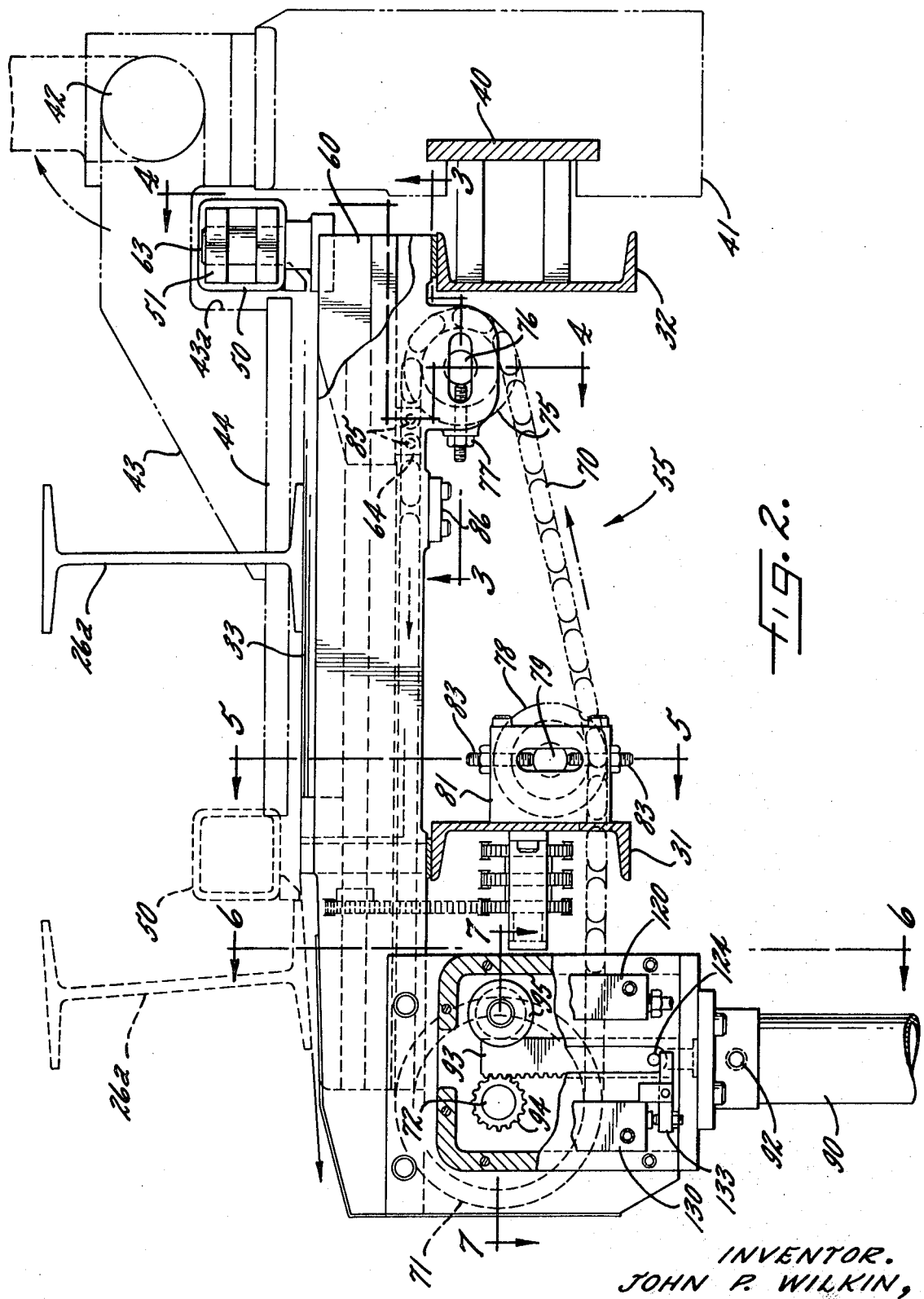

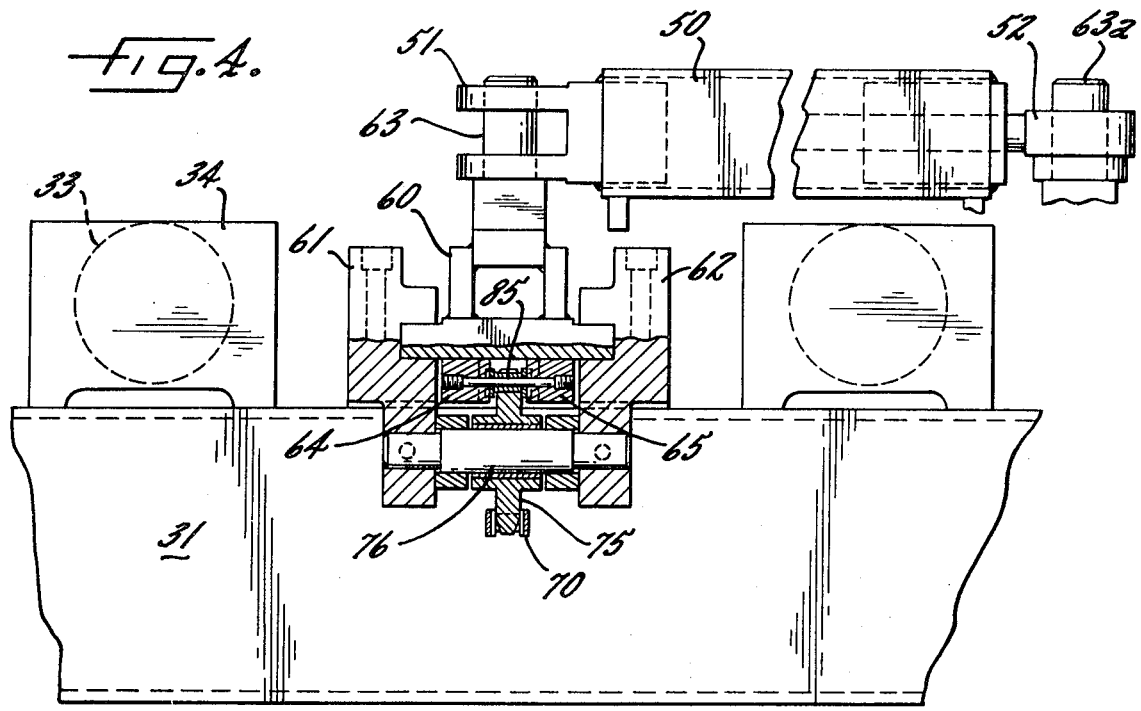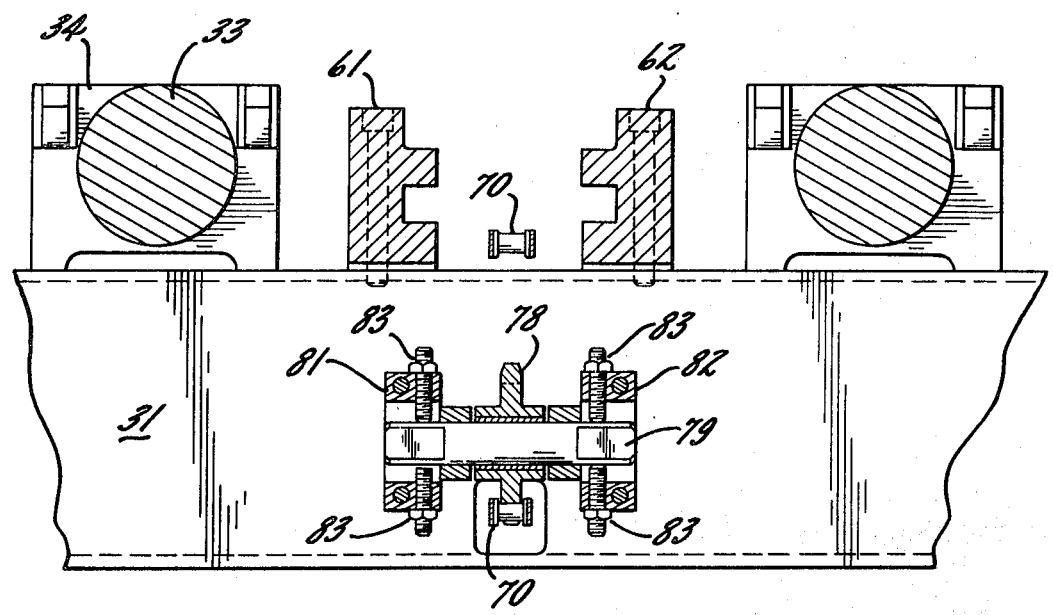

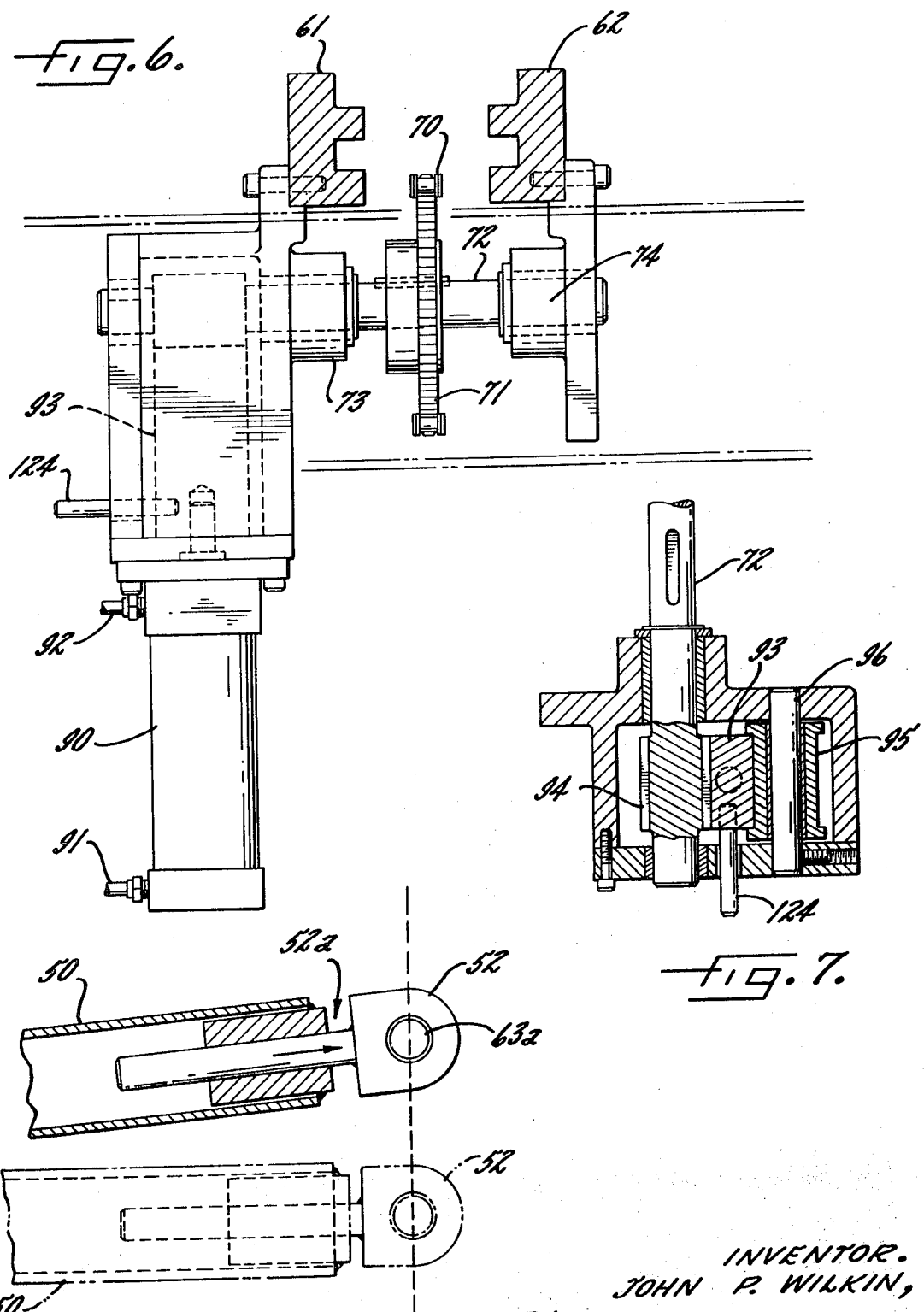

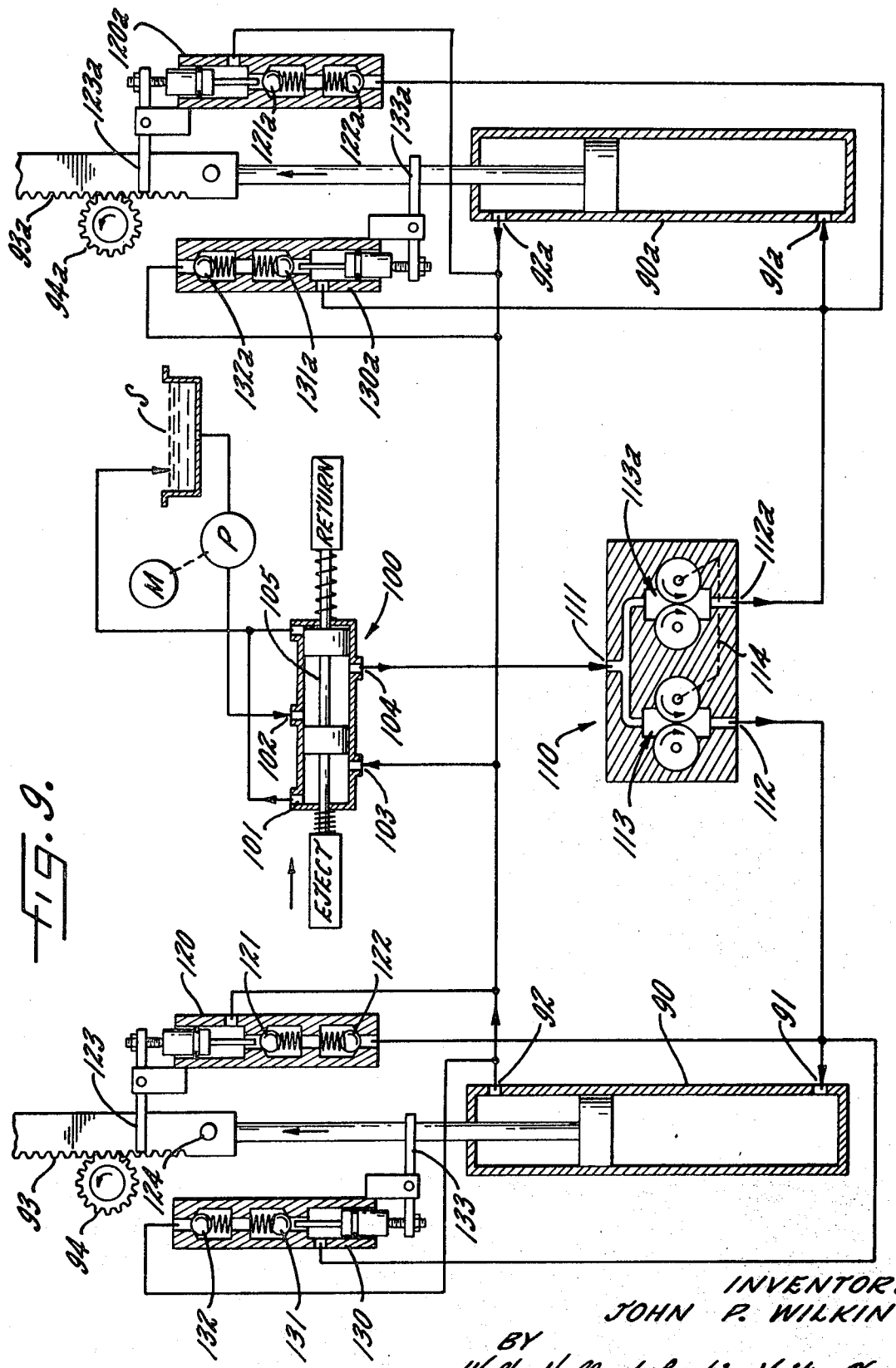

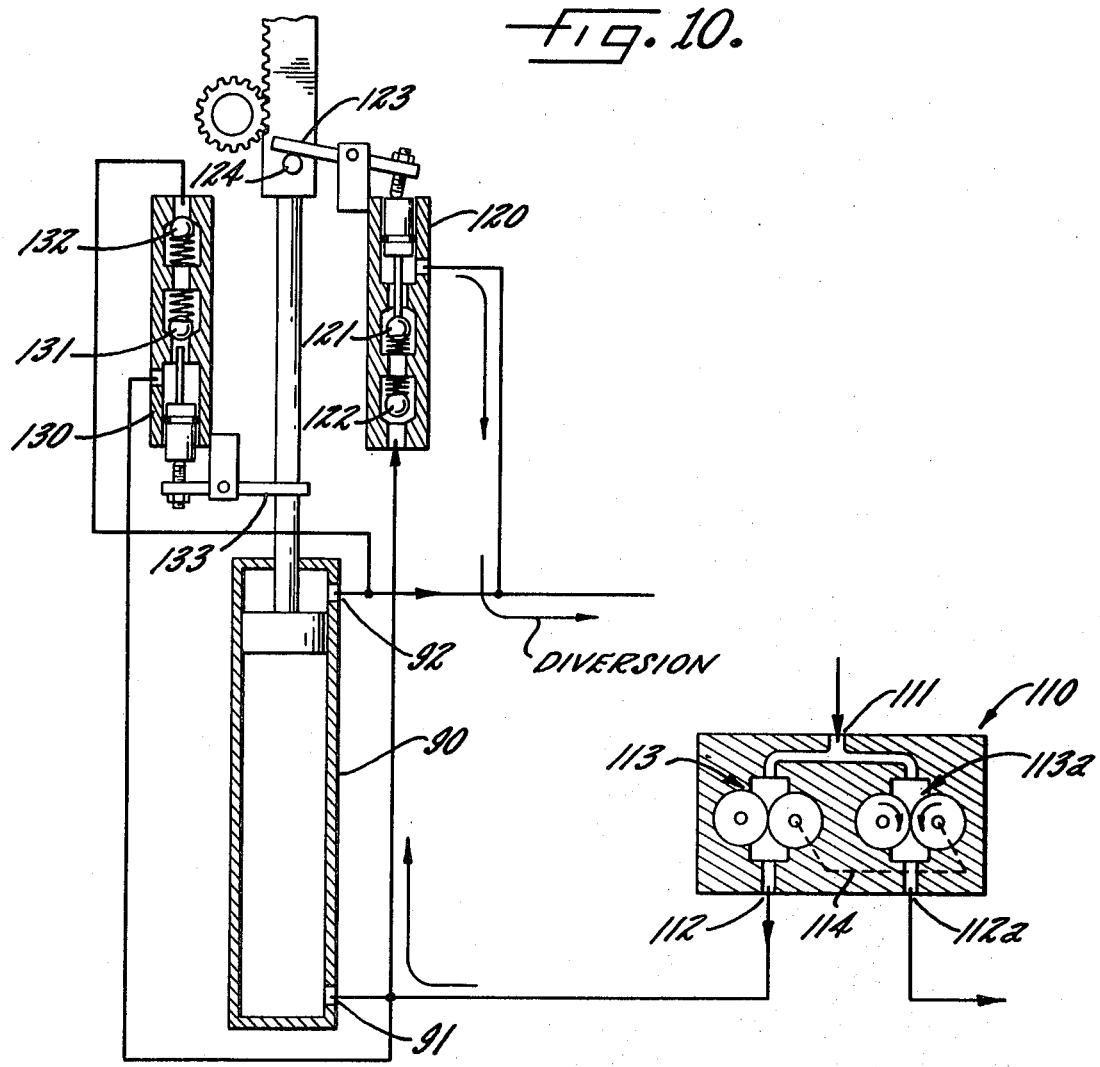

SIDE EJECTOR FOR BAND SAW CONVEYOR OR THE LIKE

It is an object of the present invention to provide a side ejector for a band saw conveyor which includes an ejector bar, or beam, which is swept broadwise across the conveyor for discharge of an engaged workpiece into a suitable receptacle at the side of the conveyor thereby to free the conveyor to receive a successive workpiece. It is a related object to provide a side ejector in the form of an ejector bar, powered at its ends by separate actuators but which has means for insuring that the actuators are restored to a reference position at the end of each power stroke so as to avoid cumulative error.

It is another object of the present invention to provide a side ejector which is rapid and effective in its action and which is particularly well suited for remote control from a control station located at the band saw.

It is a more detailed object of the invention to provide an ejector bar which cooperates with, and which is arranged in overlapping relation with respect to a dead stop, thereby to minimize the length of conveyor required to provide both the dead stop and ejecting functions.

In one of the aspects of the invention it is an object to provide a side ejector in which the ejector bar may be extended to any desired length simply by addition of sections and in which means are provided for insuring that the sections move precisely in unison with one another with no possibility of cumulative error even after long periods of operation.

Thus it is a general object of the present invention to provide an ejecting mechanism for a band saw conveyor which is safe and fool proof in its operation, which requires only simple control means for initiating the ejection and return strokes from a central control station and which requires no special exercise of skill or judgment on the part of the operator of the machine.

Other objects and advantages of the invention will become apparent upon reading the attached detailed description and upon reference to the drawings in which:

FIG. 1 is a plan view of a band saw and conveyor setup employing an ejector for broadwise ejection of workpieces from the conveyor.

FIG. 2 is a vertical section, somewhat enlarged, taken along the line 2—2 in FIG. 1.

FIG. 3 is a fragmentary section taken along the line 3—3 in FIG. 2.

FIGS. 4, 5 and 6 are vertical sections taken along lines 4—4, 5—5 and 6—6 respectively in FIG. 2.

FIG. 7 is a fragmentary section taken through the rack and pinion along line 7—7 in FIG. 2.

FIG. 8 is a diagram showing the effect of the telescoping connection at one end of the ejector bar.

FIG. 9 is an hydraulic circuit diagram of a type preferred for use in practicing the present invention.

FIG. 10 is a partial diagram corresponding to FIG. 9 showing diversion, with equalization, at the end of the "eject" stroke.

While the invention has been described in connection with a preferred embodiment, it will be understood that I do not intend to be limited by the particular embodiment shown but intend, on the contrary, to cover the various alternatives and equivalent constructions included within the spirit and scope of the appended claims.

Turning now to the drawings there is disclosed in FIG. 1 a band saw 20 having a stationary table 21 and a reciprocable frame 22 carrying a saw blade 23, with the presented portion of the saw blade being turned so that it lies in a plane parallel to the direction of reciprocation for cutting on the forward stroke. The band saw controls are conveniently located on a control console 24 at the front of the machine. At the left hand or inlet side of the machine is a conveyor 25 which feeds a length of stock 26 between the jaws of a clamping vise 27 mounted on the saw table.

On the downstream side of the saw is a conveyor 30 having longitudinal frame members 31, 32 which are preferably of channel shape and which support a series of spaced rollers 33 which are journaled, at the ends, in supports 34.

For the purpose of positioning the leading end of a length of stock for cutting off a work piece to exact length, a dead stop is provided on the downstream side as covered in my copending U.S. application Ser. No. 50,532 filed concurrently herewith. The dead stop structure includes a supporting rail 40 mounting a traveling carriage 41. Hinged to the carriage at a joint 42 is a stop member 43 having an engaged stop surface 44 which extends across the width of the conveyor.

In operation the carriage 41 is run out to a predetermined position as indicated by noting the reading on a calibrated tape 45 which is connected to the carriage. The carriage is then clamped to the rail. The stock 26 is advanced into engagement with the stop surface 44, the vise 27 is clamped shut to hold the stop in position, and the cut is made. The stop member 43 is then retracted slightly along the axis of the hinge 42 and rocked upwardly clear of the severed workpiece which can then be advanced into the position shown at 26a in readiness for ejection.

In accordance with the present invention an ejector bar, or beam, normally extending in a storage position along one side of the conveyor, is coupled at its ends to ejector chains which are powered by individual reversible actuators by a multiplying rack and pinion coupling. Thus referring to FIGS. 1–7, an ejector bar 50 is provided which occupies a storage position along the "near" edge of the conveyor and which has "eye" connections 51, 52 at its ends secured to chain drive assemblies 55, 56. For engaging the eye 51 of the bar the chain assembly 55 includes a transverse slide 60 mounted between ways 61, 62 and having an upwardly extending pin 63 which is fitted into the eye 51. The slide 60 has a pair of depending, spaced-apart brackets 64, 65. To drive the slide transversely of the conveyor a chain 70 is used which is trained about a driving sprocket 71 mounted upon a shaft 72 journaled in bearing plates 73, 74 (FIG. 6). Horizontally alined with the top of the drive sprocket 71 is an idler sprocket 75 mounted upon a shaft 76, the ends of which are secured in the way members 61, 62 (FIG. 4) and with a tension take up adjustment 77. For guiding the lower run of the chain a second idler sprocket 78 is provided mounted upon a shaft 79 which is supported in pillow blocks 81, 82 having adjusting or take up screws 83. The chain passes between the depending brackets 64, 65 on the slide 60 and is pinned to the latter by pins 85. Proper spacing between the way members 61, 62 is maintained by a bridge 86 which is connected between them.

For the purpose of driving the shaft 72 to provide multiplication of stroke, a reversible actuator 90 is used having fluid connections 91, 92 and a rack 93 which engages a small diameter pinion 94 which is integral with the shaft 72. The rack is maintained in mesh with the pinion by a back-up roller 95 which is mounted on a shaft 96.

It will be apparent, then referring to FIG. 2, that when the actuator 90 is pressurized to elevate the rack 93, pinion 94 rotates the sprocket 71 counterclockwise so that the slide 60, which is connected to the chain, sweeps across the width of the conveyor from the storage position to the dotted discharge position. Because of the substantial difference between the pitch diameter of the pinion 94 and the effective diameter of the sprocket 71, stroke multiplication is achieved on the order of 3½ to 1, thereby insuring sufficient travel of the ejector bar using a relatively compact actuator with limited upward projection of the rack 93 when the actuator is fully extended. Corresponding structure 56 is employed at the other end of the bar 50 for operation in unison, corresponding parts being assigned the same reference numerals, where applicable, with addition of subscript a.

For the purpose of insuring that both ends of the ejector bar are moved precisely in step with one another and without any cumulative error, a flow divider of the positive or metering type is interposed in the hydraulic circuit leading to the actuators, with a diverter valve, which is actuated at the end of the stroke, for diverting the pressure fluid so that both actuators are free to achieve a reference position at the end of each stroke, thereby insuring that the actuators remain in step and precluding development of cumulative error over a series of strokes. Thus referring to FIG. 9 which shows the preferred form of hydraulic circuit, a pump P, driven by a motor M, draws fluid from a sump S. Connected to the output of the pump and to the sump line is a four way valve 100 having connections 101, 102 and connections 103, 104 controlled by a spool 105. The connection 104 feeds a flow divider 110 having an "inlet" connection 111 and "outlet" connections 112, 112a. The fluid divider will be recognized as a commercially available product consisting, in effect, of two gear sets 113, 113a of the type employed in a gear pump and with their shafts mechanically coupled together by a mechanical connection indicated at 114. Because of the mechanical connection, equal amounts of fluid are metered to both of the actuators 90, 90a so that they operate in unison to produce substantially equal strokes. There is always the possibility, however, that a little more fluid, in this case oil or the like, may leak past one of the sets of gears 113, 113a than the other so that upon passage of time one of the actuators will tend to bottom ahead of the other. This would be undesirable since once bottoming occurs in one of the actuators rotation of the gears is stopped and fluid cannot be fed to the other actuator in order to enable it to "catch up".

Accordingly a diverter valve 120 is provided having oppositely facing check valves 121, 122 and with means for unseating one of the check valves, to permit diversion to the sump, of pressure fluid around the actuator which is the first to bottom at the end of the stroke. In the present instance the unseating means is in the form of a lever 123 which is engaged by a pin 124 on the rack 93 for unseating of the check valve 121. When the check valve 121 is open the connections 91, 92 of the actuator 90 are effectively connected together. Thus the diverter valve 120 may be considered to create a "short circuit" around the actuator.

Let is be assumed that the valve 100 is in the condition shown so that equal metered amounts of fluid are fed to the lower connections of the two actuators 90, 90a, but suppose that the actuator 90 tends to bottom at its upper end slightly ahead of the actuator 90a. Bottoming is accompanied by the striking of the lever 123 by the pin 124 on the rack, thereby unseating the ball 121 so that any fluid thereafter furnished to the actuator 90 is not trapped but simply diverted to the sump, as shown in FIG. 10, thereby permitting the flow divider to continue to operate and to furnish fluid until bottoming also occurs in the actuator 90a. Thus both ends of the ejector bar will be positioned in an outer reference position for return, in step with another, on the return stroke to the storage position.

For initiating the return stroke the spool of the valve 100 is manually reversed so that pressure fluid exists at the connection 103 and so that fluid is returned to the sump via connection 104. This causes both of the actuators to be pressurized for movement of the racks downwardly and for corresponding retracting movement of the chains. However in this mode of operation the outlet and inlet functions are reversed. That is, the flow divider, instead of metering pressurized fluid from the pump, serves to meter return flow of fluid from the connections 91, 91a of the actuators backwardly into the sump. In the event that the actuator 90 is the first to bottom in the downward direction, this would, normally, block further movement in the flow divider to prevent fluid from being fully discharged from the actuator 90a to preventing it from completing its downward stroke. Therefore to continue furnishing of fluid to the left hand side of the flow divider, to permit it to continue to operate, even though the actuator 90 is bottomed, a second diverter valve 130 is provided having check valves 131, 132 therein and with the valve 131 being unseated by a lever 133 engaged by the pin 124 at the lower extreme of the actuator stroke. This effectively diverts fluid around the actuator 90 so that fluid continues to be supplied to the connection 112 of the flow divider until the fluid from the lower end of the actuator 90a is completely discharged.

The above discussion has assumed that it is the actuator 90 which is the first to bottom. Corresponding diverter valves 120a, 130a are provided for actuator 90a to take care of the condition where the latter actuator is the first one to bottom at either end of the stroke. It is particularly important that both of the actuators be allowed to complete their downward strokes to insure that the ejector bar is retracted fully into its storage position along one side of the conveyor since it must, in such position, register with spaced notches, indicated at 43a in FIG. 2, which are formed on the underside of the stop member 43. This overlapping of the ejector bar with the dead stop enables long workpieces to be handled by the conveyor while keeping the conveyor down to a reasonable length.

The automatic repositioning in reference position brought about by the diverter valves at the end of each stroke not only prevents the development of any cumulative positioning error but also enables use of a less precise and hence less expensive flow divider, resulting in a saving which will substantially pay for the added cost of the diverter valves. Moreover, because of the diverter valves, the system is immune to the effects of leakage which may develop in any flow divider over a period of time. The resultant system not only achieves synchronous movement at the ends of the ejector bar but is substantially foolproof, requiring little or no maintenance over long periods of time. Nevertheless, because of the residual possibility of failure in one half of the system, means are provided for permitting effective elongation of the ejector bar to accommodate the canted condition. This is brought about by providing a telescoping joint 52a at the end of the ejector bar 50 as shown in FIG. 8 the term "telescoping connection" as used herein refers to any connection which accommodates elongation of the distance between the connection points at the ends of the bar.

Where pieces are to be ejected which are longer than the ejector bar 50 a third chain drive assembly may be provided similar to the unit shown in FIGS. 2–7 along with another section of bar 50, the two sections thus being arranged end to end for movement by a total of three chain drive units. The only changes necessary where this is done are the provision of a third actuator with its additional diverter valves and substitution of a flow divider having three sets of gears and three output connections. In the same way the system can be extended to four or more sections.

While the use of two diverter valves with each of actuators has been discussed for achieving a reference position at the ends of both the ejection and retraction strokes, a single diverter valve, effective only upon completion of, say, the retraction stroke, may be used. Stated in other words, it would be possible to achieve adequate referencing by using only the diverter valves 130, 130a while dispensing with the valves 120, 120a. Also, while the invention has been discussed in connection with a mechanically triggered diverter valve, referencing may be also achieved by use of a relief valve which is set somewhat higher than the pressure normally attained at the actuators without departing from the invention. For example relief valves could be interposed in the system at the connections 92, 92a set at a pressure slightly higher than the normal operating pressure. As the first one of the actuators bottoms in the downward direction, the resulting increase in back pressure would open the associated relief valve, freeing the gears for additional rotation, for flow of additional fluid to the tardy actuator, permitting the latter to advance and join the first actuator in the retracted reference position.

The use of a diverter valve with each actuator, mechanically operated as the actuator moves into its bottomed condition, is preferred because of the greater force which then becomes available at the tardy actuator. The reason for this is that the pair of flow divider gears which are unloaded when diversion occurs operate as a gear motor, applying torque through the shaft 114 to the gears associated with the tardy actuator to augment the pressure applied to the latter thereby to insure complete bottoming in spite of the presence of obstructing forces.

While the device, as described, ejects workpieces at the backside of the conveyor, it may be employed with equal efficiency for ejection of workpieces at the front, whereupon the fully shifted position of the bar 50 would become the "home" position, without requiring any change in the ejector construction. However, for front ejection it would be necessary either to switch the stop gage support to the opposite side of the conveyor or to elongate the conveyor so that the ejection station is at a downstream position beyond the stop gage with no overlap.

I claim as my invention:

1. In an ejector for ejecting a lengthy workpiece broadwise following cutoff in a band saw or the like, the combination comprising a conveyor extending downstream from the band saw, an ejector bar having a storage position in which it extends along one side of the conveyor, the ejector bar having an extensive pushing surface for parallel surface engagement of workpieces of different length, means providing first and second loops of chain extending transversely of the conveyor and coupled to the respective ends of the ejector bar, first and second reversible actuators, means including a rack and pinion connection for coupling the actuators to the chains, means including a reversing valve for applying pressure fluid to one end of said actuators for movement of the ejector bar from its storage position to its ejecting position and for applying pressure fluid to the opposite end of the actuators for restoring the ejector bar to its storage position, a positive metering type flow divider interposed between the reversing valve and the actuators for metering fluid to and from the actuators in substantially equal amounts for substantially equal movement of the ejector bar at its ends, a diverter valve associated with each of the actuators for diverting the pressure fluid applied to the associated actuator upon completion of the actuator stroke so that in the event one actuator completes its stroke before the other the flow divider may continue to operate until the second actuator also completes its stroke thereby to insure the return of each end of the ejector bar fully to a storage reference position.

2. In an ejector for ejecting a lengthy workpiece broadwise following cut-off in a band saw or the like, the combination comprising a conveyor extending downstream from the band saw, an ejector bar having a storage position in which it extends along one side of the conveyor, means providing first and second loops of chain trained about spaced sprockets and extending transversely of the conveyor and coupled to the ends of the ejector bar, first and second reversible fluid actuators, each of said actuators having a rack and small diameter rack pinion with the pinions being coupled to sprockets of the respective chains for multiplying the stroke of the chains with respect to the stroke of the actuators, a source of pressure fluid, means including a flow divider having its input connected to the source of pressure fluid and its outputs connected respectively to the actuators for achieving equalized movements of the chains, the flow divider being of the type having a pair of gear sets mechanically coupled together for rotation in unison for metering of equal amounts of fluid to the outputs, and means effective upon the bottoming of one of the actuators for diverting fluid therefrom to enable continued operation of the flow divider until bottoming occurs in the other actuator.

3. In an ejector for ejecting a lengthy workpiece broadwise following cut-off in a band saw or the like, the combination comprising a conveyor extending downstream from the band saw, a dead stop extending transversely of the conveyor, an ejector bar having a storage position in which it extends along one side of the conveyor, the dead stop being positionable between the chain drive assemblies and recessed to bridge the ejector bar when the latter is in storage reference position, the dead stop being rockable upwardly out of the way of the ejector bar, first and second chain drive assemblies presenting first and second loops of chain extending transversely of the conveyor and coupled to the respective ends of the ejector bar, first and second reversible actuators, means including rack and pinion connections for coupling the actuators to the chains, means including a reversing valve for applying pressure to one end of said actuators for movement of the ejector bar from its storage position to its ejecting position and for applying pressure fluid to the opposite end of the actuators for restoring the ejector bar to its storage position, a positive metering type flow divider interposed between the reversing valve and type flow divider interposed between the reversing valve and the actuators for metering fluid to and from the actuators in substantially equal amounts for substantially equal movement of the ejector bar at its ends, a diverter associated with each of the actuators for diverting the pressure fluid applied to the associated actuator upon completion of the actuator stroke so that in the event one actuator completes its stroke before the other the flow divider may continue to operate until the second actuator also completes its stroke thereby to insure the return of each end of the ejector bar fully to the storage reference position.

* * * * *